United States Patent [19]

Palmberg

[11] Patent Number: 4,546,440
[45] Date of Patent: Oct. 8, 1985

[54] METHOD AND PLANT IN PROCESSING, PARTICULARLY CUTTING UP ELONGATED OBJECTS SUCH AS TIMBER

[75] Inventor: Ulf Palmberg, Nybro, Sweden

[73] Assignee: AB Gustaf Kahr, Nybro, Sweden

[21] Appl. No.: 506,339

[22] Filed: Jun. 21, 1983

[30] Foreign Application Priority Data

Jun. 23, 1982 [SE] Sweden .................. 8203915

[51] Int. Cl.$^4$ .................. G06F 15/46; B26D 5/30
[52] U.S. Cl. ........................ 364/475; 83/71; 83/364; 144/357; 364/469
[58] Field of Search ............... 364/468, 469, 474, 475; 83/71–73, 360, 363, 364, 365, 371; 144/356, 357

[56] References Cited

U.S. PATENT DOCUMENTS

| | | | |
|---|---|---|---|
| 3,931,501 | 1/1976 | Barr et al. | 364/475 |
| 4,011,779 | 3/1977 | Berg | 83/71 |
| 4,085,638 | 4/1978 | Fifer | 83/71 |
| 4,328,725 | 5/1982 | Gschwend | 83/364 X |
| 4,415,978 | 11/1983 | Craemer et al. | 364/475 |

*Primary Examiner*—Joseph Ruggiero

[57] ABSTRACT

A method and a plant in processing, especially cutting objects such as timber.

The invention relates to a method of cutting up elongate objects such as boards e.g. for providing parquet blocks. The method relates, inter alia, to preventing the creation of unnecessary waste and includes measuring the length of every board (6) between its leading edge (L) and trailing edge (T) by advancing the board (6) between rollers (16) so that pulse trains corresponding to the respective board length are obtained. These are stored in a dator (21) register, markings (10–15) for possible defects (7–9) being positionally registered. In subsequent cutting (21) the stored pulses are deducted for deductions from the length of board (6) and controlling the cutting process, until a terminal portion (E) of the board is arrived at, the trailing edge (T) of said portion forming a reference (P) for the leading edge (L) of the next successive board, subsequent to which continued deduction from the length of the terminal portion being carried out until the trailing edge is reached in conjunction with initiating deduction from the length of the next successive board (25).

9 Claims, 7 Drawing Figures

METHOD AND PLANT IN PROCESSING, PARTICULARLY CUTTING UP ELONGATED OBJECTS SUCH AS TIMBER

In timber processing there is nowadays a great variety of plants for cutting up timber into workpieces suited to production. The initial material used, e.g. long boards of fillets, generally contains defects such as knots, shakes and the like, some portions also being warped. In the production of parquet boards or boards for cladding, it is important that defects present in the initial material are cut away and that intermediate portions of the timber are optimally recovered for subsequent production. A certain amount of waste or off-cuts is unavoidable in cutting off defective portions, and also in conjunction with trimming timber ends.

With regards to the need of varying length of cutting timber workpieces it is important that usable portions, e.g. even those situated close to slanting or defective end edges can be utilized. It has been found, even in conjunction with very advanced, known automatic cross-cutting plants that much timber goes to waste, e.g. due to deficiencies in feed and measurement techniques of the plant in question.

The prior art is described, inter alia in the Swedish Pat. Nos. 402 542, 345 524, 383 121, 353 958 and the U.S. Pat. Nos. 3,856,061, 3,871,258 and 3,941,019.

The present invention solves the problems mentioned above in an extremely well-adapted manner. What is novel with the method in accordance with the invention is essentially based on the suitable application of markings on the respective elongate object which is to be cut up, for controlling the cutting process, e.g. in response to the presence of defects, the leading and trailing edges in the feed direction being registered as to length. What is novel in the invention essentially consists in that the object is cut up as deductions are made from its length until a terminal portion of the object remains, the trailing edge for this portion forming a stop of the leading edge of the next successive object, deduction for the terminal portion being made in conjunction with the initiation deduction from the length of said successively following object.

The invention also relates to a plant for carrying out said method.

Practical trials have shown that it has been possible to obtain an optimalization of the cutting result hitherto unattained in the prior art. As with many modern plants, the plant in accordance with the invention also utilizes computer control of the different processes, but this will be clearly apparent from the following description of an embodiment.

What is characterizing for the present invention will be apparent from the following claims.

The invention will now be described in detail with reference to the accompanying drawings, the Figures of which illustrates an embodiment, and where FIG. 1 schematically illustrates a plant in accordance with the invention, as seen from above, FIG. 2 is a side view to a larger scale of a measuring station in the plant illustrated in FIG. 1, FIG. 3 similarly illustrates the cutting station itself partially sectioned and seen in elevation to a larger scale.

Figure 1:
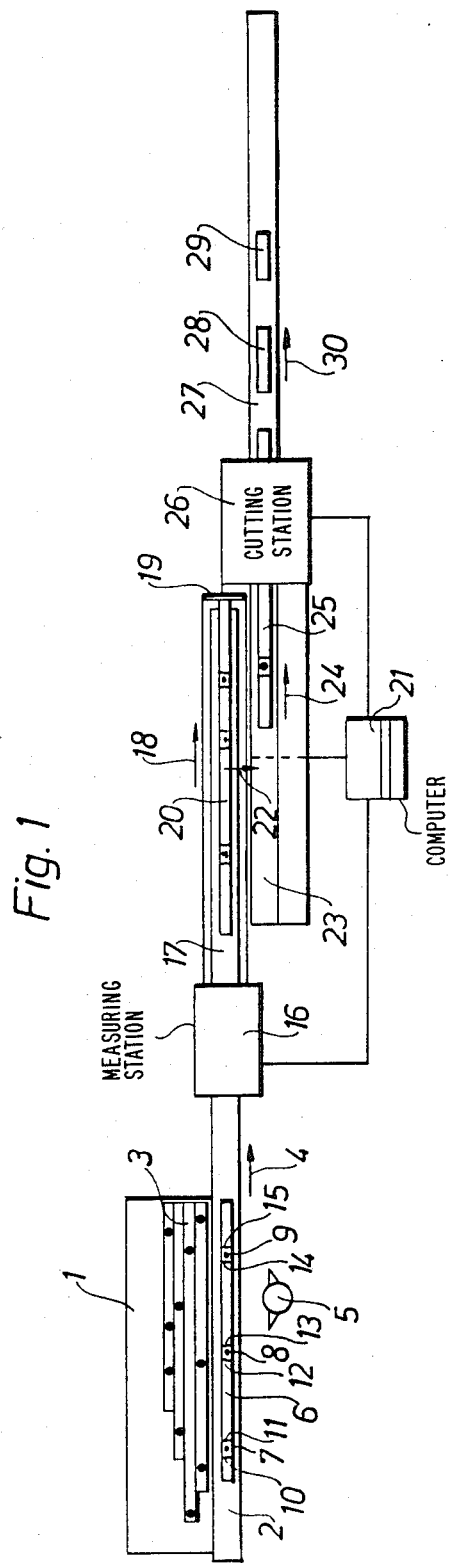

The plant illustrated in FIG. 1 comprises a timber store 1, e.g. in the form of an inclined surface sloping towards a conveyor 2 and supporting a stock of timber 3. An operator 5 is stationed at the conveyor, which is intended to travel in the direction of arrow 4. The operator, who has a timber length 6 on the conveyor 2 in front of him, has the task of marking defects 7, 8, 9 on the timber length 6. In the present case, marking is performed such that the operator marks lines 10, 11 on either side of defect 7, lines 12 and 13 on either side of 8 and lines 14 and 15 on either side of 9. The marked length 6 is then allowed to accompany the conveyor in the direction of arrow 4 towards a measuring station 16, which measures the length of the timber length and coacts in the registration of the positions of the lines 10–15 marked by the operator 5. When the length has passed the measuring station 16 it comes out onto a further conveyor 17 with its travel in the direction of arrow 18 towards a stop 19, against which a previous length 20 bears, as will be seen from FIG. 1.

By an order from a computer 21, the length 20 is moved transversely in the direction of arrow 22, with the aid of shifting means not more closely illustrated. The unit 20 is thus thrust over onto a further conveyor 23 with its travel in the direction of arrow 24. A previous length 25 on the conveyor 23 is partially visible in FIG. 1, the length 25 being in the process of being fed to a cutting station 26. The length 21 may, of course, not be shifted to the conveyor 23 before the length 25 has been fed into the cutting station 26 entirely.

A further conveyor 27 extends out from the cutting station 26 and discharges ready-cut workpieces 28, 29 in the direction of arrow 30. The workpieces are suitably conveyed to sorting racks, but these do not constitute any part of the invention and have therefore not been illustrated.

The different conveyors may comprise roller or belt conveyors, according to what is suitable in the individual cases, and as will be seen from the description hereinafter.

Figure 2:
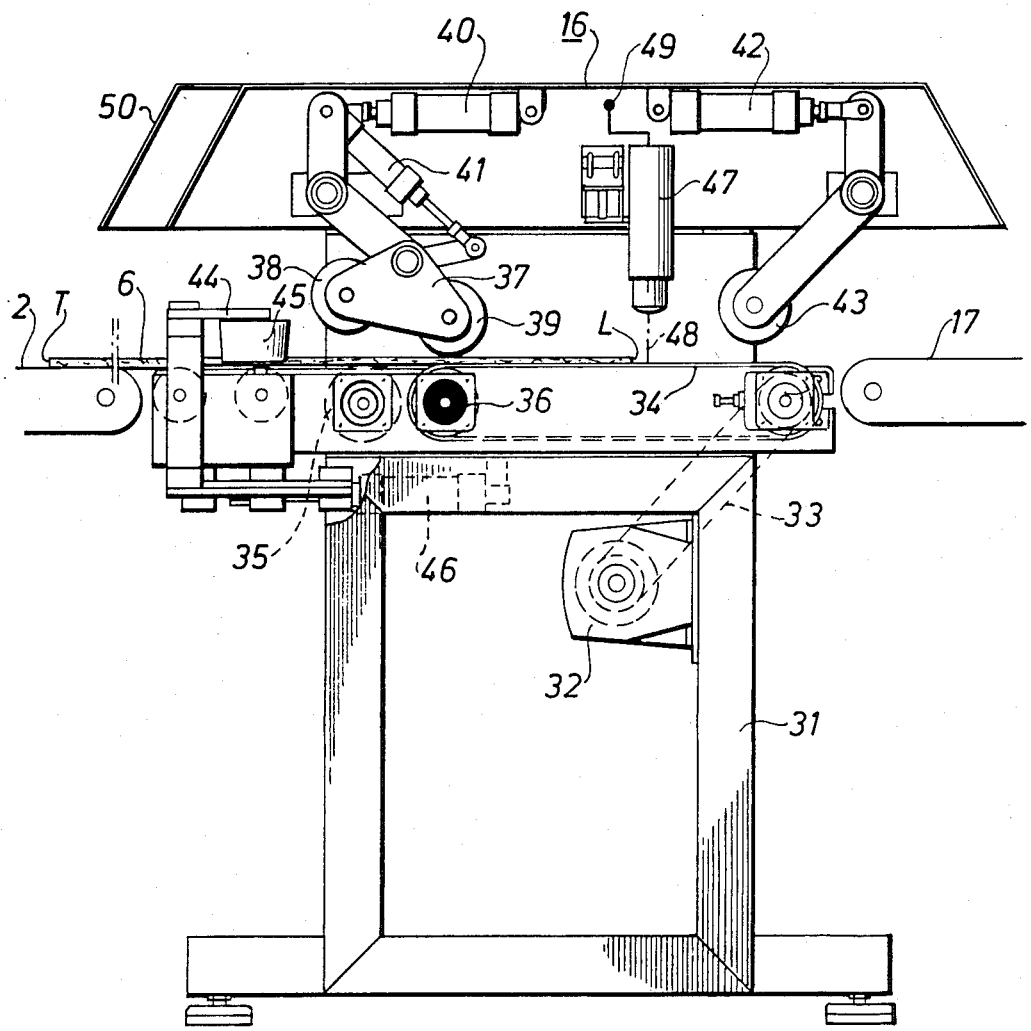

FIG. 2 illustrates in elevation and to an enlarged scale the measuring station 16 of FIG. 1. This station is built up on a frame 31 between the conveyors 2 and 17. The frame carries an electric motor 32 driving a belt conveyor system 34 via a belt transmission 33. A roller 35 is mounted in front of the conveyor belt system and driven by it. A pulse generating sensor 36 is coupled to the conveyor belt system 34. Above the latter the frame 34 carries two rollers 38, 39 mounted in a bogie suspension 37, and these rollers may regulatably be brought to bear against a timber length with the aid of the pressurized fluid cylinders 40, 41. A further roller 43 actuated by a pressure fluid cylinder 42 is adapted for coacting with the timber length in question, when the latter is on the belt conveyor system 34. Conical rollers 45 mounted on swinging arms 44 are provided for lateral guidance of the timber lengths. The swinging arms are adapted for operation by a pressurized fluid system 46. Above the conveyor system 34 there is mounted a photocell device 47 having a light beam 48 trained on the timber length being processed. Via connection 49 the photocell device 47 is connected to a computer 21. A protective casing 50 is mounted above the rollers and photocell device. The function of the measuring station 16 will be apparent from the following description.

Figure 3:
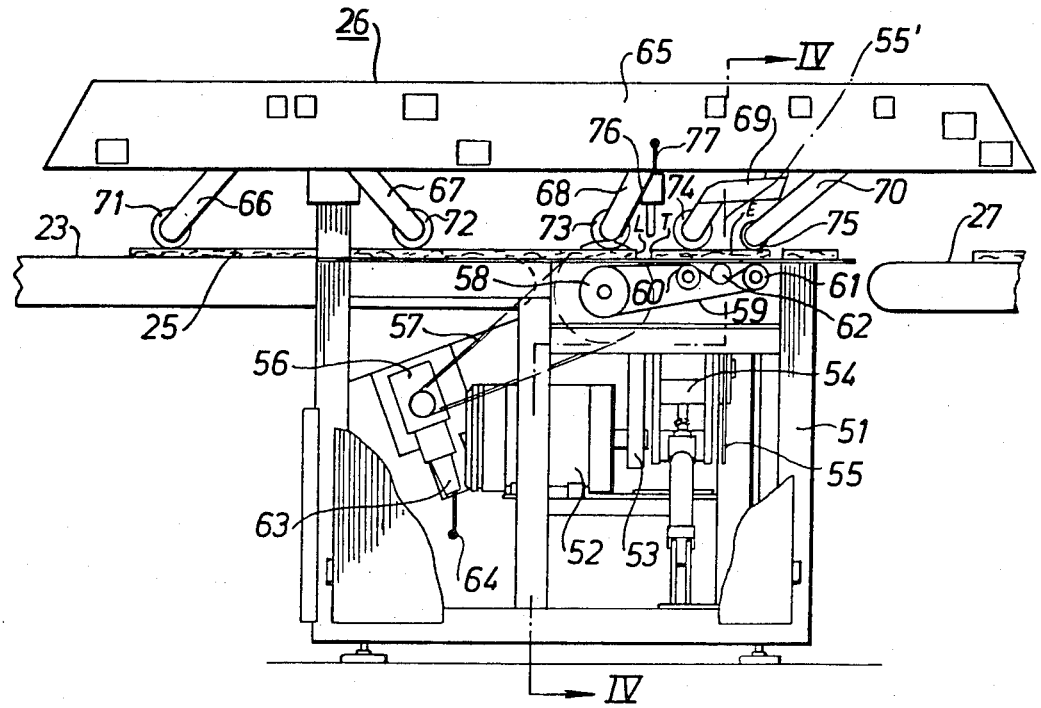

The cutting station 26 is illustrated in elevation in FIG. 3 and to an enlarged scale. The equipment is built up on a frame 51 which carries an electric motor 52 with a belt 53 drive to a circular saw 55 mounted on a pivotable arm structure 54. The frame also carries a motor 56 driving a feed roller 58 via a toothed belt 57. A further toothed belt 59 driven by the roller 58 drives two further feed rollers 60 and 61, between which there is arranged a tension roller 62. A pulse generating sensor 63 is coupled synchronously to the motor and is also connected to the computer 21 via a line 64. A plurality of pivoting arms 66-70 is arranged in a superstructure 65. These arms are operable in an unillustrated manner with the aid of pressurized fluid cylinders, included in the superstructure 65, in a manner similar to that described for the pivoting arm in FIG. 2. The free ends of arm 66-70 carry pressure rollers 71-75. The entire cutting equipment is arranged between the conveyors 23 and 27. In position above the feed rollers 58, 60 and 61, but in front of the saw 55 in the transport direction, there is arranged a photocell 76, connected to the computer 21 via a line 77.

Figure 4:
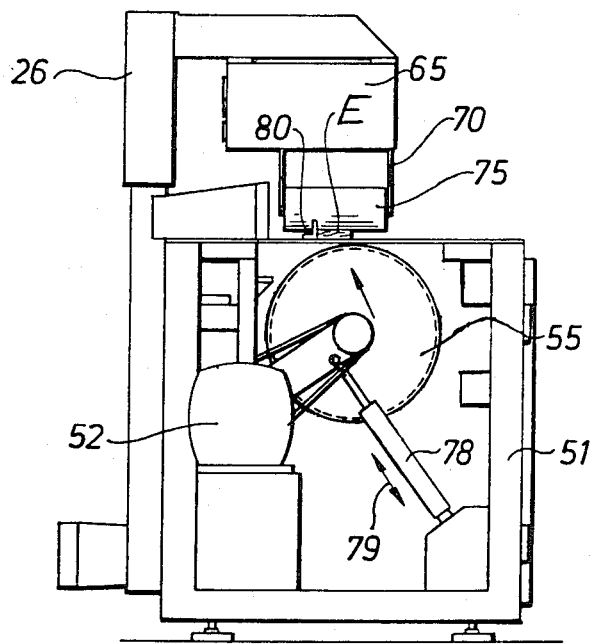
FIG. 4 is a section along the line IV—IV in FIG. 3.

FIG. 4, which is a section along the line IV—IV in FIG. 3, illustrates the disposition of the circular saw 55 itself on its pivotable arm structure 54, which is operated by a pressurized fluid cylinder 78 for movement in the direction of the double arrow 79. A stop 80 is arranged for lateral guidance of the timber length, in this case length 25.

The plant functions in the following way. It is assumed that the operator 5 moves a timber length down from the store 1 onto the conveyor 2, and in the illustrated case it is assumed that this length is length 6 for parquet blocks. The length has three defects 7, 8 and 9, as illustrated in the Figure. As already mentioned, the operator's task is to indicate the position of these defective portions and to draw transverse marks 10-11, 12-13 and 14-15 on either side of said defects 7, 8 and 9, respectively. The marks are suitably made with a marking pen containing colour for which the photocell device 47 of the measuring station 16 is sensitive. After marking, the operator allows the length to be taken by the conveyor 2 to the measuring station 16.

When the length is fed towards the measuring station 16 it first meets the lateral guide rollers 45 and is straightened up for further conveyance towards the roller 35. Together with the conveyor belt system this roller remains inactive while awaiting the computer 21 to come into readiness for receiving measuring information for memory registration. The use of the roller 35 serves the purpose of preventing wear on the following belt system when lengths are fed onto it. The roller 38 does not come into action at this stage either. When the starting order goes from the computer, the feed is started and the rollers 38, 39 are thrust against the length so that it is in firm contact with the underlying roller 35 and conveyor 34. Measurement of the length 6 is now taken over by the belt system 34 and the leading edge L of the length 6 approaches the light beam 48 of the photocell device 47. When the leading edge reaches the beam 48 a signal is generated by the device 47 and taken to the computer 21. The sensor 36 now generates pulses in response to movement in the system 34. At the instant the signal from the device 47 has arrived at the computer, the register of the latter begins to store the pulses sent by the sensor 36. Length registration of the blank length 6 is thus obtained, and does not cease until trailing edge T passes the light beam 48. An interrupt signal is obtained in the computer when the trailing edge T leaves the light beam 48, this signal blocking continued storage of the pulses sent from the sensor 36. The computer memory thus stores a particular number of pulses representing the actual length of each blank length. During the passage of the blank length 6 under the light beam 48 the beam also strikes the lines drawn by the operator and interrupt signals also occur for these lines. These signals form markings in the pulse counting sequence indicating the distance of the marked line from the front edge L of the blank length 6. Accordingly, when the blank length 6 has completely passed the photocell device 47 the computer memory contains information, which, in conjunction with a program already fed to the computer, is utilizable for controlling subsequent cutting operations. In order to control the cutting process in a desired manner, the computer is programmed such that it gives an optimal yield from the blank length in question. Thus, if the distance between two lines defining defects, the defects not being included between the lines, has a given dimension, cutting shall be performed such that from the piece cut there shall be obtained a piece or pieces of a length agreeing with lengths in the production schedule. It is consequently of importance that all positions of defects are accurately registered by the measuring process described, so that optimized cutting can be performed. Programming must, of course, be such that if the distance between two such lines is less than the least usable length in the production schedule, the piece concerned is removed as waste in a subsequent sorting operation. Furthermore, programming is such that workpieces of varying lengths can be cut from blank lengths such that waste is a minimum, i.e. the blank lengths are subjected to optimalized cutting. In a measuring station according to FIG. 2, it may be practically suitable to arrange a photocell device in addition to the device 47, the extra device solely having the task of indicating the leading edge L and trailing edge T of the blank lengths, device 47 solely reading off the defect marking lines 10-15.

After the blank length has left the measuring station 16 it comes out onto the conveyor 17, and as illustrated by the blank length 20 in FIG. 1, it comes against a stop 19. This position is to be regarded as a waiting position before further conveyance to the cutting station 26 takes place. Before a blank length can be fed into the cutting station 26 the conveyor 23 must be completely unoccupied, i.e. the blank length 20 can be moved transversely in the direction of the arrow 22 and onto the conveyor 23.

When a blank length such as blank length 25 comes into the cutting station 26 it is assumed that a preceding blank length has been cut up. In FIG. 3, as well as as in FIG. 5, the terminal portion E of such a blank length is illustrated, and its trailing edge in the transport direction is also denoted by T. It is assumed that the portion E is at rest, i.e. the motor 6 does not drive the rollers 58, 60 and 61. It should be noted that during the travel of the previous blank length through the cutting station there has been a continuous pulse count in response to the blank length. This pulse count is provided by the sensor 63 functioning synchronously with the motor 56. As previously mentioned, the motor drives the rollers 58, 60 and 61 with the aid of toothed belts, resulting in that they are synchronous with the motor 56 and sensor 63. The pulses thus obtained are fed to the computer and used as deduction pulses in respect of the length pulses previously registered in the computer memory.

This means that when a blank length passes the cutting station in its entirety, and the cutting position itself in appropriate cases, the pulses in the computer memory have also been deducted. As will be seen from FIG. 3, a photocell device 76 is adapted to react for the trailing and leading edges of the respective blank lengths. Accordingly, when a leading edge L comes to the device 76 a signal goes to the computer and the pulses coming from the sensor 63 are caused to deduct the length pulses for the respective blank length stored in the computer memory. If now the blank length is cut up during conveyance and its trailing edge T passes the photocell device 76, a signal state change occurs which actuates the control of the motor 56 so that it stops. This means that the remaining portion E will be arrested in its forward travel, deduction pulses being sent by the sensor 63 even during retardation. The length deduction is not yet complete, since a distance equal to the distance from the trailing edge T to the central plane of the saw 55 still remains. The piece E is however at rest now, while the next successive blank length 25 is fed towards the piece E. The leading edge L of the blank length 25 will now be fed towards the trailing edge of the piece E until contact occurs.

Figure 5:
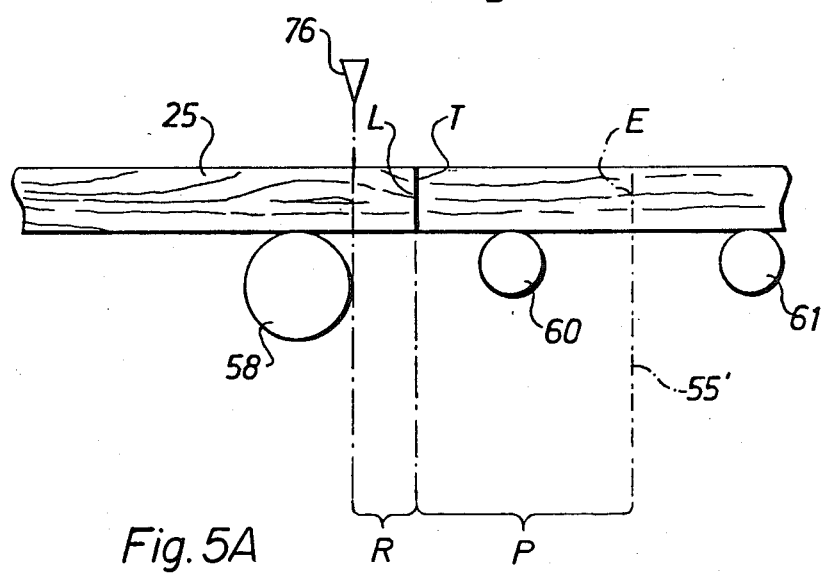
FIG. 5 is a schematic view illustrating the functional description.

The different partial sequences are clearly apparent from FIG. 5. The central plane 55' through the saw 55 is indicated by a chain-dotted line and the photocell device 76 as a triangle with its apex directed towards the path of the light beam. Thus, when the trailing edge T has passed said beam, a stop signal is sent to the motor 56 which then stops. A given retardation distance R is travelled by the piece E before the rollers 60, 61 and the motor have stopped. The trailing edge T is now a distance P from the sectional plane 55'. As already mentioned, the leading edge L of the blank length 25 is now moved into contact with said trailing edge T.

Figure 5A:
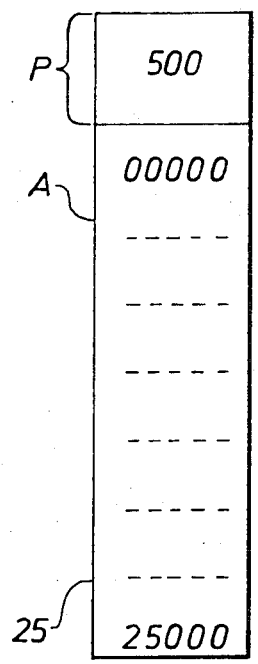
FIGS. 5A and 5B illustrate two registers of the computer.
Figure 5B:
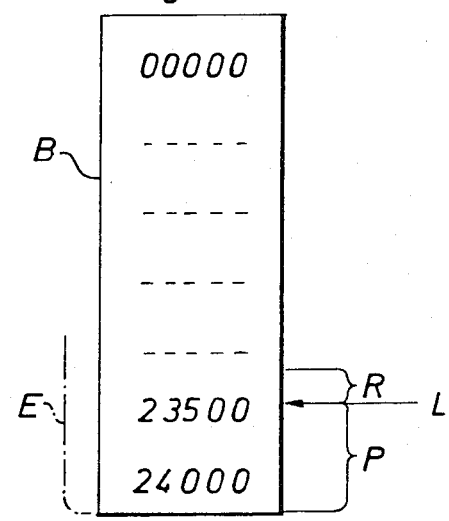

The computer is equipped with two registers A and B as illustrated by two rectangles in FIGS. 5A and 5B respectively. Each register is assumed to have a capacity such that it can store length pulses/bits for blank lengths used. In the illustrated case, it is assumed that the length of the respective rectangle represents the length of the blank length. The blank length from which the piece E remains had had a length corresponding to 24000 bits. The blank length 25 is represented by 25000 bits. During the performance of the cutting operations, the length bits have been deducted in the register B and when trailing edge T is in the illustrated position at a distance P from the central plane 55', 23500 bits have been deducted. When the blank length 25 has arrived at the trailing edge of portion E it is once again time to start the motor 56 and feed length 25 and portion E together past the central plane 55' while the remaining 500 bits are discounted, i.e. so that deduction from blank length 25 in the register A can be started when the front edge L coincides with the central plane 55'. However, to ensure that deduction at the restart will be correct, it is arranged that a double deduction takes place, by the register A for the blank length 25 being fed with an additional store of 500 bits corresponding to the remainder when the portion E is in the illustrated rest position. The deduction for the travel of the blank length 25 up to the central plane will then be absolutely assured, independently of what happens with continued conveying of the portion E, and the deduction necessary for subsequent cutting operations can be started in a correct starting position. By applying said bit information to the register A there is ensured that possible errors occurring in the handling of portion E are not applied to subsequent blank lengths, accummulating positional error thus being avoided. As mentioned deduction of the 500 bits takes place parallel in the respective registers A and B. If there is any error in conveying the portion E or it falls apart due to possible cracks, the cutting operations for the blank length 25 are not affected. It should be noted that all measurement for further conveyance takes place during an interval of rest, and programming of the computer is such that the piece E is allowed to have a length such that it rests stably against its substructure, i.e. the rollers 60 and 61, so that it can form a stop for the length 25 and be otherwise mechanically intact. As previously mentioned, a sequence measuring sequense is started in the measuring station 16 on order from the computer 21, and this order is sent as soon as a deduction has been completed and a register is empty and ready for storage. The previously stored length pulses for the blank length 25 will now be deducted as the blank length is advanced by the rollers 58, 60 and 61. As previously mentioned, there are interrupt markings in the computer memory agreeing with the position of the defect markings 1-15. As a deduction proceeds, these interrupt markings are arrived at, and an order to cut is sent by the computer, i.e. the cylinder 78 is actuated so that the saw blade 55 performs a cutting movement. In a practical case the count takes place during a time of about 15 hundredths of a second. It is naturally necessary that advancing by the motor 56 is stopped at the respective cutting operation. The motor must necessarily have short stop and start cycles. By the described method of allowing the trailing edge T of the preceding blank length to form a stop for the leading edge L of the next successive blank length there is gained, apart from good feed continuity through the cutting station, an exact positioning of the leading edges of the blank lengths as well, whereby cutting up can be given extremely small tolerances. The leading edges of the blank lengths do not need to have any indication of their position during passage through the cutting station, excepting what is needed for a starting process, and the trailing edges are allowed to form a stop, which may be at an arbitrary distance from the central plane 55' of the sawblade, since the computer is continuously capable of keeping deduction correct with the aid of the sensor 63, and thereby correct length measurement relative the end edge in question, i.e. relative also to the front edge of the following blank length.

A plurality of embodiments can be envisaged within the scope of the invention. It is essential, however, that such measurement of the blank lengths is performed that a record of the respective blank length is obtained in a memory, deduction being made from this record to provide the starting point for positioning the cuttin-up process of a concecutive blank length. It is, of course, not necessary that the blank lengths above are cut up, and processing can be performed in a variety of ways within the scope of the invention.

I claim:
1. A process of cutting up an elongate blank, for example of timber, containing defects, comprising the following steps:
   at an inspection station, providing marks on opposite sides of defects in the blank,
   transporting said blank through a measuring station while generating a first series of successive pulses representing measurement along said blank and generating signals representing said defect marks, said signals being related to said length measured by said pulses, feeding said length measurement pulses and said defect marking signals to a computer programmed to count and store said pulses, memorize said signals in relation to said pulse count and to divide lengths between defect marks into optimum numbers of sections or predetermined lengths, conveying said blank to a cutting station and transporting said blank through said cutting station while generating a second series of pulses representing movement of said blank through said cutting station, said second series of pulses being fed to said computer to count down said first series of pulses stored in said computer, and controlling cutting means at said cutting station by said computer to cut out said defects and to divide lengths between defects into an optimum number of sections of predetermined lengths.

2. A process according to claim 1, in which the transport of a first blank through said cutting station and the generation of said second series of pulses are interrupted before the trailing end of said first blank reaches said cutting means, and the leading end of a second blank is brought into engagement with the trailing end of said first blank, whereupon a remaining part of said first blank and said second blank are together transported through said cutting station, the generation of said second series of pulses being thereupon resumed.

3. A process according to claim 1, in which at said inspection station said blank is moved laterally from a storage position onto a conveyor for conveyance lengthwise to said measuring station.

4. A process according to claim 1, in which said blank is conveyed from said inspection station to said measuring station by a conveyor and is stopped before entering said measuring station to await a starting order from said computer.

5. A plant for cutting up an elongate blank, for example of timber, containing defects, comprising:

an inspection station at which marks are provided on opposite sides of defects in the blank, first transport means for transporting said blank from said inspection station to a measuring station, said measuring station comprising first feed means for feeding said blank lengthwise through said measuring station, means responsive to movement of said blank through said measuring station for generating a first series of pulses representing measurement along said blank, means for sensing said marks on said blank and producing signals related to measurement along said blank by said first series of pulses, and transmitting said pulses and signals to a computer, said computer being programmed to count and store said pulses, memorize said signals in relation to said pulses and to divide lengths between defect marks into optimum numbers of sections of predetermined lengths, second transport means for transporting said blanks from said measuring station to a cutting station, said cutting station comprising computer controlled second feed means for feeding said blank lengthwise through said cutting station, means responsive to movement of said blank through said cutting station for generating a second series of pulses representing measurement along said blank, means for transmitting said second series of pulses to said computer to count down said first series of pulses stored in said computer, and cutting means controlled by said computer to cut out said defects and to divide lengths between defects into an optimum number of sections of predetermined lengths.

6. A plant according to claim 5, in which means is provided for interrupting the feed of a first blank through said cutting station and the generation of said second series of pulses before the trailing end of said first blank reaches said cutting means, and retaining said first blank stopped until the leading end of a second blank is brought into abutment with the trailing end of said first blank, whereupon a remaining part of said first blank and said second blank are together advanced in said cutting station and the generation of said second series of pulses is resumed.

7. A plant according to claim 6, in which said means for interrupting feed of a first blank through said cutting station comprises a photocell device for sensing a leading end or trailing end of a blank and controlling said second feed means.

8. A plant according to claim 5, in which said cutting station includes a photocell device for detecting the leading edge of a blank and thereupon starting the feed of said blanks through said cutting station and initiating the generation of said second series of pulses.

9. A plant according to claim 6, in which said computer comprises two registers each having a capacity such that it can store the number of pulses representing a blank length.

* * * * *